United States Patent
Shariff et al.

(10) Patent No.: US 9,947,021 B1
(45) Date of Patent: Apr. 17, 2018

(54) METHOD, APPARATUS, AND COMPUTER PRODUCT FOR IDENTIFYING A SERVICE NEED VIA A PROMOTIONAL SYSTEM

(71) Applicant: Groupon, Inc., Chicago, IL (US)

(72) Inventors: Shafiq Shariff, Chicago, IL (US); Tyler Jennings, Chicago, IL (US)

(73) Assignee: GROUPON, INC., Chicago, IL (US)

( * ) Notice: Subject to any disclaimer, the term of this patent is extended or adjusted under 35 U.S.C. 154(b) by 0 days.

(21) Appl. No.: 13/804,403

(22) Filed: Mar. 14, 2013

(51) Int. Cl.
G06Q 30/00 (2012.01)
G06Q 30/02 (2012.01)

(52) U.S. Cl.
CPC ..... *G06Q 30/0202* (2013.01); *G06Q 30/0261* (2013.01)

(58) Field of Classification Search
CPC ............ G06Q 30/0202; G06Q 30/0261
USPC .......................................... 705/14.58
See application file for complete search history.

(56) References Cited

U.S. PATENT DOCUMENTS

| | | | |
|---|---|---|---|
| 7,072,848 B2 * | 7/2006 | Boyd ............... | G06Q 30/02 705/14.1 |
| 8,355,944 B2 * | 1/2013 | Young .................. | 705/7.31 |
| 8,521,688 B1 * | 8/2013 | Belwadi et al. ............ | 707/622 |
| 8,684,266 B2 * | 4/2014 | Bennett et al. ............. | 235/383 |
| 2005/0273377 A1 * | 12/2005 | Ouimet et al. ............. | 705/10 |
| 2009/0006182 A1 * | 1/2009 | Gammon .................... | 705/10 |
| 2010/0063870 A1 * | 3/2010 | Anderson et al. ........... | 705/10 |
| 2011/0071883 A1 * | 3/2011 | Warier et al. ............... | 705/10 |

OTHER PUBLICATIONS

In re: Sean O'Brien; U.S. Patent Application for Relevance System for Consumer Deals; U.S. Appl. No. 13/411,502, filed Mar. 2, 2012.
In re: Shafiq Shariff; U.S. Patent Application for Method, Apparatus, and Computer Program Product for Sales Pipeline Automation; U.S. Appl. No. 13/803,445, filed Mar. 14, 2013.

* cited by examiner

*Primary Examiner* — Matthew T Sittner
*Assistant Examiner* — Azam A Ansari
(74) *Attorney, Agent, or Firm* — Alston & Bird LLP

(57) ABSTRACT

A method, apparatus and computer program product are provided for identifying a service need via a promotional system, and offering the service need to a third party. Promotions may be offered via a promotional system for a consumer to purchase in exchange for a discounted product or service from a provider. Demand information, which may be collected based on promotions and/or other sources. A residual demand may be calculated based on the demand information and available inventory. The residual demand may be utilized to identify a service need. The service need may be identified in a geographic area having a similar demographic to a geographic area having an associated successful promotion. A service need may be provided to a third party or provider, and may indicate the need for a new business or expansion of a current business.

29 Claims, 7 Drawing Sheets

METHOD, APPARATUS, AND COMPUTER PRODUCT FOR IDENTIFYING A SERVICE NEED VIA A PROMOTIONAL SYSTEM

CROSS REFERENCES TO RELATED APPLICATIONS

The present application is related to U.S. patent application Ser. No. 13/803,445, filed Mar. 14, 2013, titled "METHOD, APPARATUS, AND COMPUTER PROGRAM PRODUCT FOR SALES PIPELINE AUTOMATION," which is hereby incorporated by reference in its entirety.

BACKGROUND

Various embodiments described herein are related to promotional systems, and particularly to a method and apparatus for identifying a service need via a promotional system. Applicant has discovered problems with and related opportunities for determining and using demand information for a local area. Through applied effort, ingenuity, and innovation, Applicant has solved many of these identified problems by developing a solution that is embodied by the present invention, which is described in detail below.

BRIEF SUMMARY

A method, apparatus, and computer program product are therefore provided for identifying a service need via a promotional system. A method is provided for receiving demand information relating to one or more virtual promotions, wherein the demand information is indicative of at least a forecasted number of sales and an estimated revenue generated by the forecasted number of sales, calculating a residual demand as a function of the demand information and available inventory, the residual demand comprising one or more virtual promotions and an associated quantity of at least a portion of the one or more virtual promotions that is representative of a residual demand for a geographic area, identifying at least one service need, wherein the at least one service need is derived from the demand information and the residual demand, the service need indicative of a needed service in the geographic area, and providing the service need to a third party.

In some embodiments, the method further includes generating one or more virtual promotions for one or more combinations of a category or sub-category, location, and price range, calculating a probability that a particular user would buy a particular offer in a particular time frame for at least a portion of the plurality of users and for each of the virtual offers, and determining the forecasted number of sales and the estimated revenue for at least a portion of the one or more virtual promotions as a function of at least the probability associated with each of the one or more virtual offers.

The method may further include identifying a sample geographic area in which the service need is met, and identifying at least one target geographic area in which the service need is not met, the at least one target geographic area having a demographic similar to that of the sample geographic area. The demand information comprises at least one of a category, subcategory, quantity, location information, and price range. The method may include calculating a provider suitability score for a provider, and identifying a target provider based on the provider suitability score.

In some embodiments, the method includes calculating an estimated change in sales for a provider, and identifying a target provider based on the estimated potential change in sales. The method may include receiving provider information for providers in the target geographic area, and identifying a target provider based on the provider information. In some embodiments, the method includes analyzing prior deal information, and identifying a target provider based on the prior deal information. In some embodiments, the method further includes receiving a provider quality score, and identifying a target provider based on the provider quality score. The method may include determining a need for a new business based on the service, and notifying the third party system of the need for a new business. The method may include identifying the service need based on a provider that offers a service associated with the service need but cannot meet a current demand quantity.

An apparatus is provided, comprising at least one processor and at least one memory including computer program code, the at least one memory and the computer program code configured to, with the processor, cause the device to at least receive demand information relating to one or more virtual promotions, wherein the demand information is indicative of at least a forecasted number of sales and an estimated revenue generated by the forecasted number of sales, calculate a residual demand as a function of the demand information and available inventory, the residual demand comprising one or more virtual promotions and an associated quantity of at least a portion of the one or more virtual promotions that is representative of a residual demand for a geographic area, identify at least one service need, wherein the at least one service need is derived from the demand information and the residual demand and is indicative of a needed service in the geographic area, and provide the service need to a third party.

A computer program product is provided, including at least one non-transitory computer-readable storage medium having computer-executable program code instructions stored therein, the computer-executable program code instructions comprising program code instructions to receive demand information relating to one or more virtual promotions, wherein the demand information is indicative of at least a forecasted number of sales and an estimated revenue generated by the forecasted number of sales, calculate a residual demand as a function of the demand information and available inventory, the residual demand comprising one or more virtual promotions and an associated quantity of at least a portion of the one or more virtual promotions that is representative of a residual demand for a geographic area, identify at least one service need, wherein the at least one service need is derived from the demand information and the residual demand and is indicative of a needed service in the geographic area, and provide the service need to a third party.

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the other computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

The methods, systems and apparatuses described herein may enable a promotional system (e.g., a system that provides promotion and/or marketing services on behalf of one or more providers that are offering one or more instruments that are redeemable for goods, services, experiences and/or the like by a consumer) to identify a service need (e.g., a good, service or experience that is demanded in a given area) and provide the service need to a third party (e.g., a business incubator, a franchise marketer, a business development corporation, a consultant or the like) to enable the creation of a new provider (e.g., a merchant, business owner, consigner, shopkeeper, tradesperson, vender, operator, entrepreneur, agent, dealer, organization or the like that is in the business of a providing a good, service or experience to a consumer), or the addition of a good, service or experience by a current provider to address the service need. In this regard, as discussed in greater detail below, the methods, systems, and computer program products discussed herein provide an opportunity for increased sales of promotions on the promotional system and/or expanded business opportunities for the provider.

Figure 1:
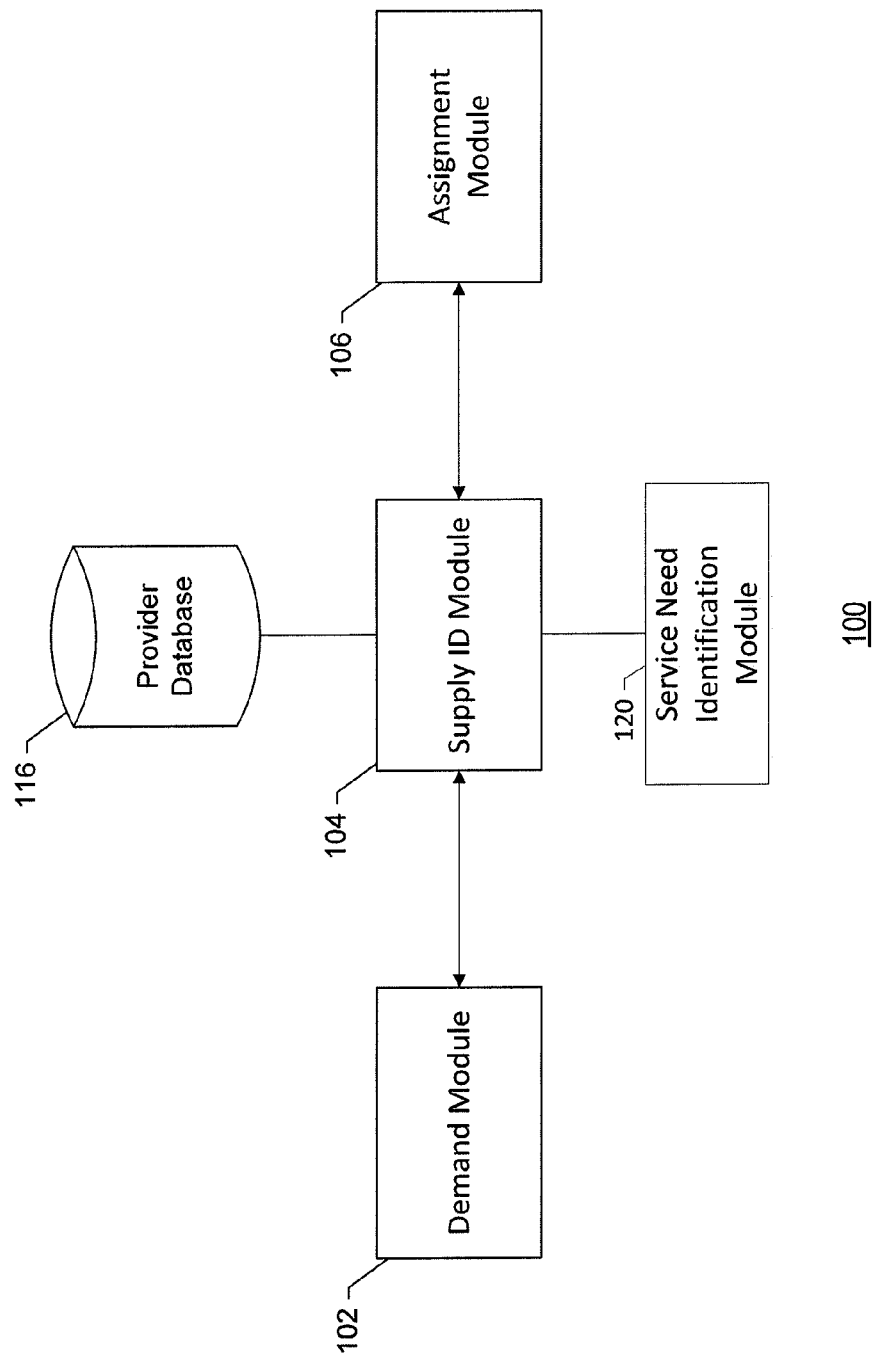
FIG. 1 is a block diagram illustrating an exemplary process for service need identification.

FIG. 1 is a block a diagram that illustrates an exemplary process for service need identification. In general, the process 100 may forecast or otherwise determine a demand via the demand module 102. The demand illustrates and/or otherwise identifies the promotions that a consumer (e.g., a client, customer, purchaser, shopper, user or the like who may be in the position to or does exchange value for one or more instruments under the terms defined by the one or promotions) is willing to purchase in a local area, and may include descriptors such as category and/or sub category of a good, service or experience, a price, a location, a time and/or the like. In some examples, the forecasted demand may be indicative of demanded promotions in a geographic area, however in other examples the demand may be indicative of a demanded good, service or experience in the local area irrespective of a promotion.

Example demand information may include an indication of a quantity of instruments that are demanded, (e.g., any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences), category or subcategory of the service, price or price range, location information (such as a geographic area the provider associated with the promotion should be located in), and/or other demographic information relating to the demand for a promotion. The demographic information may additionally or alternatively include a forecasted number of sales of a virtual promotion, if implemented, and/or estimated revenue for the provider and/or promotional system.

In order to facilitate the forecasted demand, the demand module 102 is configured to generate one or more virtual promotions. Virtual promotions are representative of one or more promotions that could be offered in a local area. For example, $25 massages or $10 for $20 at a local clothing store.

The virtual promotions may be analyzed to determine the probability that a particular consumer would purchase the particular virtual promotion. The demand module 102 may be configured to generate or otherwise determine the probability based on, for example, past purchase history, historic demand for similar offers, search engine results, survey results, current market trends and/or the like. Using the probabilities, a forecasted demand may be generated. Further discussion may be found in U.S. patent application Ser. No. 13/411,502, filed Mar. 2, 2012, titled "RELEVANCE SYSTEM FOR CONSUMER DEALS," which is incorporated by reference in its entirety.

In some example embodiments, the demand module 102 may adjust the forecasted demand based on factors, such as, but not limited to seasonality, economic conditions, holidays, weather and/or the like. The demand module 102 is configured to output a forecasted demand to the supply ID module 104.

In some example embodiments, a supply identification (ID) module 104 is configured to ingest the forecasted demand, adjusted demand or a combination thereof. Using the forecasted demand, the supply ID module 104 is further configured to reduce or otherwise further modify the forecasted demand based on current promotions in an inventory to determine a residual demand (e.g., an unmet demand).

Using the residual demand, the supply ID module 104 is configured to assign each promotion defined by the residual demand to one or more providers in an instance in which the provider is able to provide the same or similar goods, services and/or experiences as defined by the forecasted demand. In some examples, the one or more providers may be determined based on a global listing of providers stored in a provider database. As such, to the extent the provider provides a good, service or experience that matches or is related to a demanded promotion, the demanded offer may be assigned or otherwise linked to that provider. Each provider may therefore be assigned zero or more demanded promotions as defined by the residual demand. As such, each demanded promotion may be assigned to zero or more providers.

In an instance in which a demanded promotion can be assigned to a provider in some example embodiments, the assignment module 106 is configured to receive a ranked list of providers. Using the ranked list of providers, the assignment module 106 may further be configured to assign the providers in the ranked list of providers to one or more sales resources (e.g., salesperson). The assignment module 106 may also be configured to re-prioritize and/or re-assign providers to sales resources according to a predetermined time period, such as daily, weekly or the like.

In some example embodiments, a demanded promotion may not be assigned to a provider, because there may not be a provider that is configured to provide that service, whereas in other embodiments, a provider may exist to provide the service but may not be interested in offering a promotion. In other examples, there may be unmet demand in a geographic area and/or the like. As such, those demanded promotions may be identified by the service need identification module 120.

In some examples, the service need identification module 120 may identify a particular service need, wherein the at least one service need is derived from the demand information and the residual demand, and is indicative of a needed service in a geographic area. The service need identification module 120 may subsequently provide the service need to a third party, suggest the expansion of a current provider based on the service need and/or the like. Example operations performed by a promotional system to accomplish the identification and provision of a service need are described in further detail below with respect to FIGS. 2-5.

Figure 2:
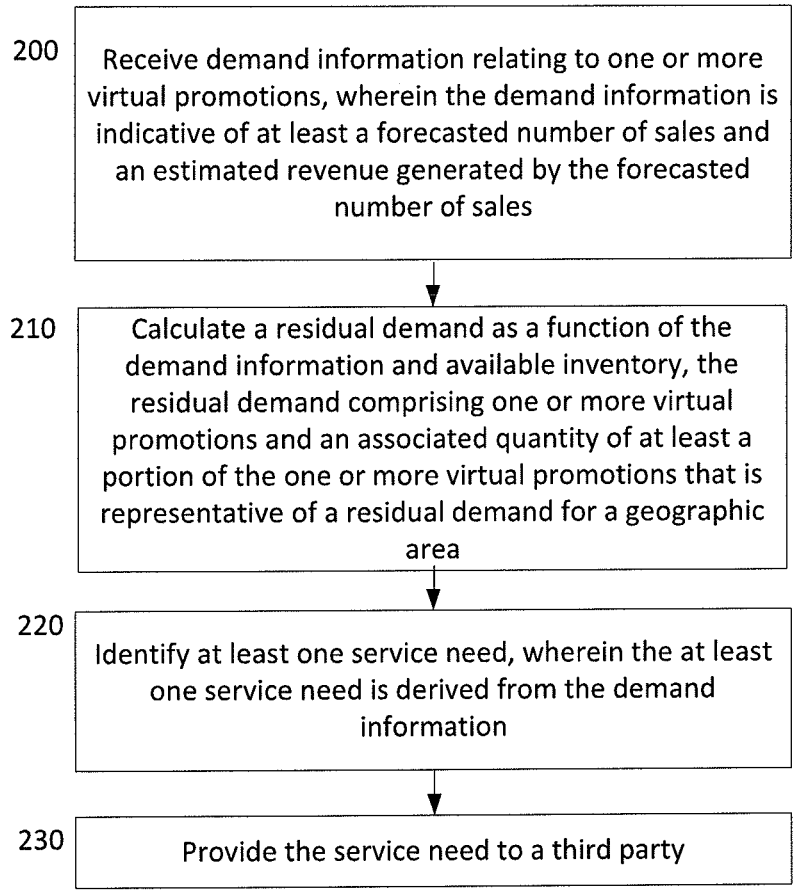
FIG. 2 is a flowchart illustrating operations for identifying a service need and providing a service need via a promotional system, according to an example embodiment.

FIG. 2 is a flowchart illustrating operations for identifying a service need and providing a service need via a promotional system, according to an example embodiment. As shown by operation 200, the promotional system may be configured for receiving demand information relating to one or more virtual promotions, wherein the demand information is indicative of at least a forecasted number of sales and an estimated revenue generated by the forecasted number of sales. The demand information may be communicated to the promotional system from a third party system. Additionally or alternatively, the demand information may be generated on the promotional system, such as with demand module 102, through analysis of prior promotion sales, data regarding provider relationships, and/or other data on or otherwise available to the promotional system.

In some embodiments, a forecasted number of sales, which may or may not correlate to the quantity of available promotions, may be provided, such as a given number of sales in a given time period, (e.g., 450 instruments sold in one week). Additionally or alternatively, an estimated revenue for the promotional system) and/or estimated revenue for a provider of the service may be indicated by the demand information. For example, an estimated revenue for the promotional system may be $5 per sold instrument, or a total of $2,250 for the 450 forecasted number of instrument sales. For a provider honoring the promotion, an estimated revenue may be $15 per sold instrument, or a total of $6,750 for the forecasted number of sales. The estimated generated revenue for the provider may additionally include revenue generated from repeat consumers returning to the provider for services beyond the initial service associated with the promotion. The demand information may be stored, for example, on the promotional system, such as in a promotional database and/or other memory.

As shown by operation 210, the promotional system, such as with demand module 102, may be configured to calculate a residual demand as a function of the demand information and available inventory, the residual demand comprising one or more virtual promotions and an associated quantity of at least a portion of the one or more virtual promotions that is representative of a residual demand for a geographic area. In some embodiments, available inventory may be provided by the supply ID module 104, allowing the demand module 102 to calculate a residual demand based on the demand information and available inventory. The demand module 102 may additionally calculate a quantity of instruments that are not met or otherwise provided by the current inventory of the virtual promotion that represents a residual demand for a particular geographic area. For example, the demand module 102 may determine that there is residual demand for 500 instruments of a virtual promotion in a particular geographic area.

Continuing to operation 220, the promotional system, such as with service need identification module 120, may be configured to identify at least one service need, wherein the at least one service need is derived from the demand information and the residual demand and is indicative of a needed service in the geographic area. As such, the promotional system may receive information, or inventory, regarding known providers in the geographic area. Such information may be received from a third party, or may be obtained from data stored internally to the promotional system, such as on the merchant database 116. If an analysis of the inventory indicates the demand is not met, a service need may therefore be generated. The service need identification module 120 may receive inventory information of providers in the particular geographic area, and based upon the information, may identify a service need for that area.

In some embodiments, the service need identification module 120 may identify a service need by calculating a probability that a particular user would buy a particular offer in a particular time frame for at least a portion of the plurality of users and for each of the virtual offers. As such, the service need identification module 120 may determine a forecasted number of sales and the estimated revenue for at least a portion of the one or more virtual promotions as a function of at least the probability associated with each of the one or more virtual offers.

In some embodiments, the service need identification module 120 may be configured to identify a service need comprising a particular type or category of goods, and/or a specific product. In this regard, goods, products, and/or services currently offered by a third party and/or provider may be analyzed to determine a new good, product, and/or that may help increase sales and/or revenue for the third party. As such, current goods, products, and/or services offered by a provider may be received from supply ID module 104, provider database 116, demand module 102, and/or the like. For example, the service need identification module 120 may receive information regarding a current menu at a restaurant, and identify a service need for the restaurant by determining that if the restaurant were to offer a kids' value meal, the overall sales and/or revenue for the restaurant would increase. In some embodiments, the service need identification module 120 may provide an estimate of the increase in sales and/or revenue. As another example, the service need identification module 120 may determine that if a particular provider offers a drink special, their food sales may also increase.

Having identified the service need, the service need identification module 120 may provide the service need or strategic information relating to the service need to a third party, as shown by operation 230. In some embodiments, the service need may be a valuable piece of intelligence for providers local to the area of need. The third party may be an intermediary whose business is distributing such intelligence to providers or other resources. In some embodiments, the third party may represent the provider itself. Identification of a target provider is described in more detail with respect to FIG. 5. Regardless of the receiving party type, the service need may be provided, and may indicate to the third party how a provider in the local area could meet the service need. In some embodiments, the service need may be indicative of a need for a new business and/or the service need may be indicative of a need for current business expansion. In some embodiments, the service need may comprise a specific product and/or product type that a provider may offer in order to increase sales or revenue.

Figure 3:
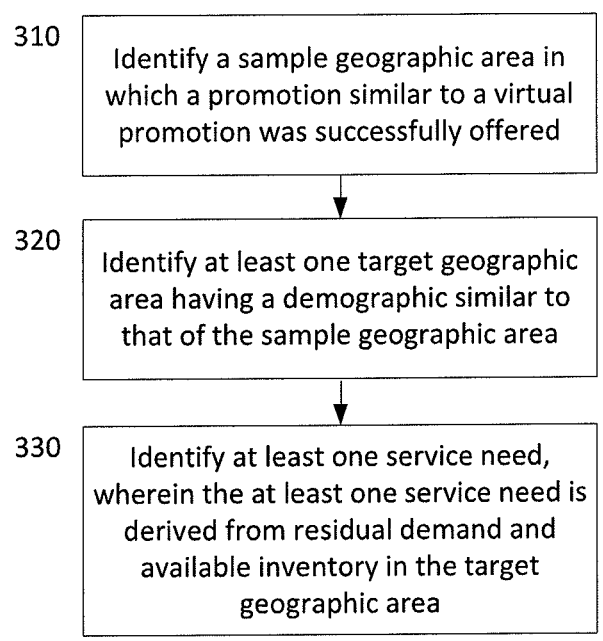
FIG. 3 is a flowchart illustrating operations for identifying a service need and providing a service need via a promotional system, according to an example embodiment.

FIG. 3 is a flowchart illustrating operations for identifying a service need in a target geographic area based on a sample geographic area, via a promotional system, according to an example embodiment. As shown by operation 310, the promotional system may be configured, such as by service need identification module 120, for identifying a sample geographic area in which a promotion similar to a virtual promotion was successfully offered. In this regard, a promotion similar to a virtual promotion may include a promotion having the same or similar parameters to those of the virtual promotion. For example, consider a promotion including 500 instruments having a purchase price of $20, for $40 worth of Chinese takeout. The promotional system may identify another promotion, in which 450 instruments were purchased for $15, worth $30 of Chinese takeout. The promotional system may determine that the promotion was successful. Success may be measured by a the promotional system's revenue, the provider's revenue, number of instruments sold, percentage of instruments sold compared to those offered, and/or any other data regarding the promotion and made available to the promotional system.

In some embodiments, such as those in which the promotional system identifies a successful promotion similar to a demanded promotion, the promotional system may identify a sample geographic area in which the successful promotion was offered. In an example scenario, the successful promotion may have been offered to consumers in Town A, having a population of 180,000 and a mean family size of 2.8. Town A may therefore represent the sample geographic area, and the population and family size may be considered a demographic characteristic of the geographic area. The promotional system may therefore identify another geographic area having a similar demographic to Town A.

At operation 320, the promotional system may be configured, such as with the service need identification module 120, for identifying at least one target geographic area having a demographic similar to that of the sample geographic area identified with respect to operation 310. A similar demographic may be defined as having one or more characteristics in common, or within a particular range of one another. Examples of such characteristics may include location type (e.g., city, suburban area), description of the associated population (race, age, household size, etc.), and/or the like. For example, a Town B having a population of 190,000 and a mean family size of 2.6 may be identified as having a similar demographic to that of Town A.

At operation 330, the promotional system may be configured, such as with the service need identification module 120, for identifying at least one service need, wherein the at least one service need is derived from the demand information and available inventory in the target geographic area. As such, the promotional system may receive information, or inventory, regarding known providers in the geographic area. Such information may be received from a third party, or may be obtained from data stored internally to the promotional system. If an analysis of the inventory indicates the demand is not met, a service need may therefore be generated. Continuing with the example scenario, the promotional system may receive inventory information of providers in Town B, and based upon the information, the promotional system may determine no Chinese takeout restaurants are present. A service need, indicating a need for Chinese takeout in Town B, may therefore be identified.

Figure 4:
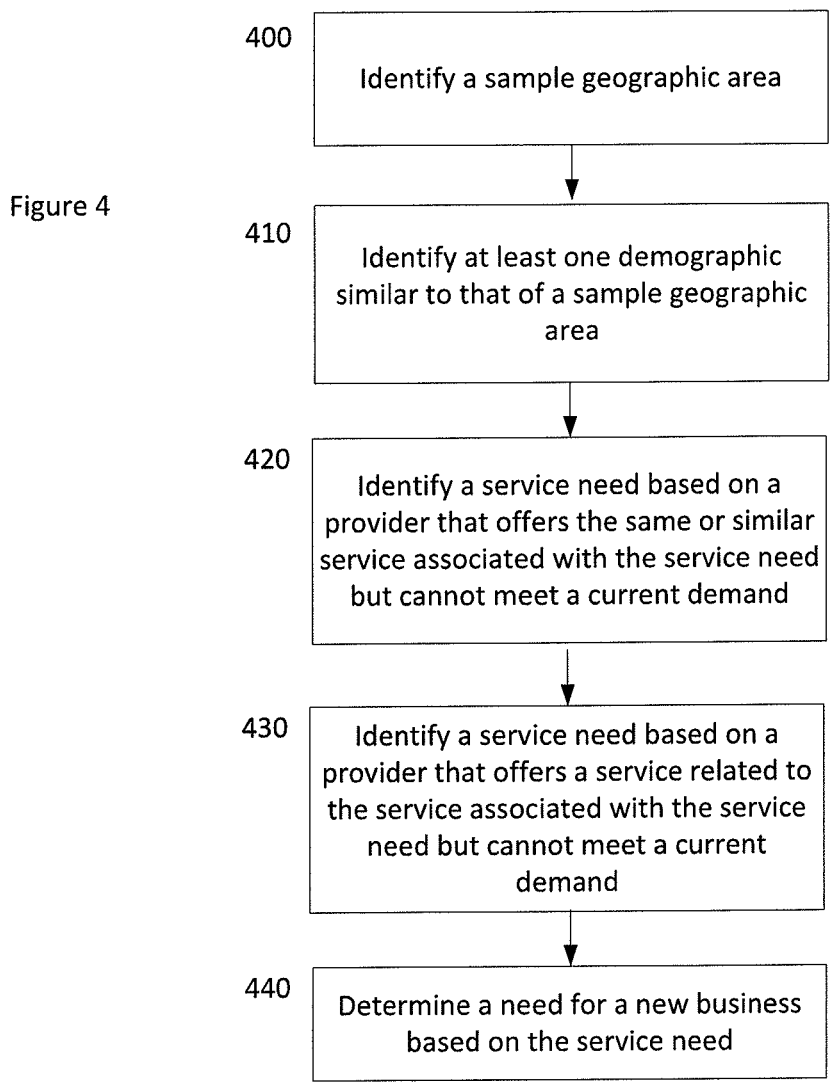
FIG. 4 is a flowchart illustrating operations for identifying a service need according to an example embodiment.

FIG. 4 is a flowchart of operations for identifying a service need according to an example embodiment. It will be appreciated that other methods may be employed by the promotional system for identifying such a service need. At operation 400, the promotional system may be configured for identifying a sample geographic area. As such, the promotional system may receive information on successful businesses, from a third party system, for example, a data store of the promotional system itself, and/or another source. In some embodiments, the promotional system may utilize promotion transaction history, current or prior promotions, and/or provider information to identify providers, services, and/or types of service that have succeeded in the past. Success may be measured by a the promotional system's revenue, the provider's revenue, number of instruments sold, percentage of instruments sold compared to those offered, and/or any other data regarding the promotion and made available to the promotional system. The geographic area associated with the provider, service, and/or service type may be a city, county, or other jurisdiction, or it may be a more general geographic region, such as the east coast.

At operation 410, the promotional system may be configured to identify at least one demographic similar to that of the sample geographic area. Information on the demographics of various geographic areas may be received from a third party system or retrieved internally to the promotional system, as described above with respect to operation 320.

Continuing to operation 420, the promotional system may be configured to identify a service need based on a provider that offers the same or similar service associated with the service need but cannot meet a current demand. For example, a Chinese takeout restaurant in a particular city may be able to honor redemptions associated with the sale of 400 instruments offering $40 worth of Chinese takeout for $20. However, if demand information indicates a demand for 500 instruments for $40 worth of Chinese takeout for $20, a service need may be identified. In some embodiments, the service need may be identified by analyzing sales history of promotions. For example, if a promotion has a fast sellout rate, and/or higher sales than expected, a service need may be identified because the promotional system may consider the fast sellout as not meeting the current demand. As such, following the identification of the service need, such a service need may be provided to a third party and/or the provider (e.g., the existing Chinese takeout restaurant). The service need may be valuable to another party, as the intelligence (e.g., the service need) may indicate a high likelihood of success for the provider if the provider is able to expand their business to meet the higher demand.

At operation 430, the promotional system may be configured to identify a service need based on a provider that offers a service related to the service associated with the service need but cannot meet a current demand. For example, based on example demand information relating to a virtual promotional and/or a demand for Pilates classes, the promotional system may identify a service need in a geographic area, based on information indicating that a Yoga studio is present, but not a Pilates studio. The promotional system may identify the Yoga studio as offering a service related to Pilates. The intelligence (e.g., the service need) may therefore be valuable to the Yoga studio, as the Yoga studio may consider offering Pilates classes if the Yoga studio becomes knowledgeable of a demand for Pilates classes.

Continuing to operation 440, the promotional system may be configured to determine a need for a new business based on the service need. In the above example embodiment, a need for a new business offering Pilates classes may be identified. In another example embodiment, there may be no related service present in a particular geographic area, but the promotional system may identify a service need, and a need for a new business. The service need and/or need for a new business may, in some embodiments, be provided to a third party. The third party may, in turn, provide the service need and/or need for a new business to entrepreneurs, investors, and/or the like, who may find the information valuable in a pursuit to open a new business. As such, in some embodiments, the promotional system may receive compensation in exchange for providing a service need to a third party or provider.

Figure 5:
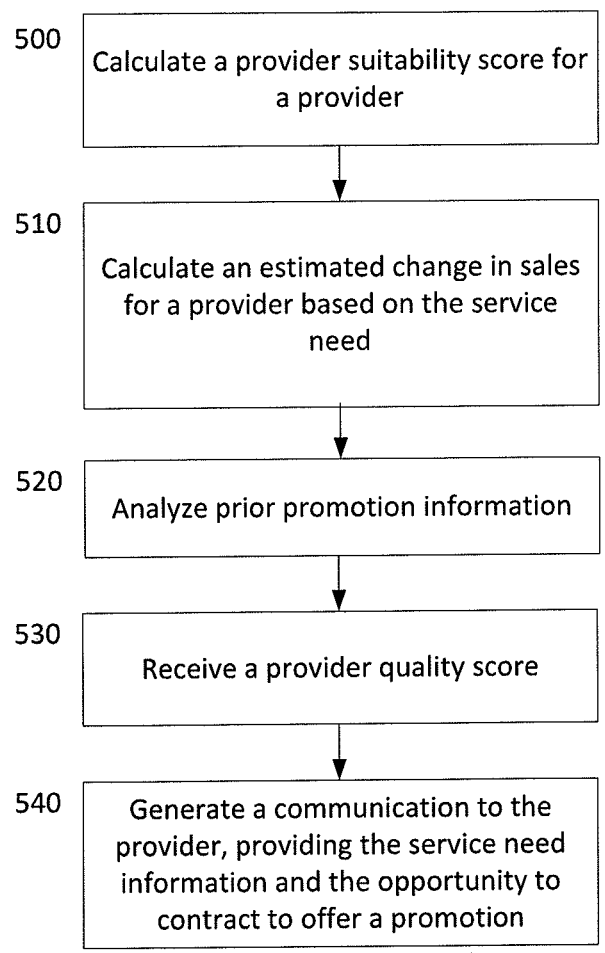
FIG. 5 is a flowchart illustrating operations for identifying a target provider according to an example embodiment.

FIG. 5 is a flowchart illustrating operations for identifying a target provider according to some example embodiments. As shown by operation 500, the promotional system may be configured to calculate a provider suitability score for a provider. The score may provide an indication for how well the provider may be able to fulfill a service need, and may be based on any number of conditions. For example, a provider that has partnered with the promotional systems in the past, and had successful promotion sales may receive a high suitability score. Location and/or proximity of the provider may also be factored into a suitability score. Additionally or alternatively, any number of outcomes of operations 510-530, described below, may be accounted for in a suitability score, and in some embodiments, various factors may be weighted differently. In some embodiments, a listing of providers may therefore be scored, and a provider having a high or highest suitability score may be identified as a target provider, and provided with the service need, as described with respect to operation 340 above.

Continuing to operation 510, the promotional system may be configured to calculate an estimated change in sales for a provider based on the service need. The promotional system may therefore project sales statistics following offering of a promotion. The calculation may include factors such as retention of new customers brought in as a result of a promotion, and any repeat business obtained because of the promotion. Sales resulting from the promotion itself may also or alternatively be considered in the calculation. The estimated sales may additionally or alternatively indicate sales of the promotion instruments and/or generated revenue for the promotional system. Providers with a relatively high estimated change in sales may therefore be identified as a target provider. In some embodiments, the identified target provider may be provided with the service need, as described with respect to operation 340 above.

As shown by operation 520, the promotional system may be configured to analyze prior promotion information. Providers found to have offered promotions in the past may be identified as target providers due to a presumed likelihood of offering additional promotions, and/or expanding their businesses to provided additional services. In particular, the promotional system may target providers identified as having popular and/or successful promotions in the past. Based on the prior promotion information, a target provider may be identified and provided with the service need, as described with respect to operation 340 above. The target provider may therefore use the service need to expand their business, and/or to offer a new promotion.

Continuing to operation 530, the promotional system, such as with the supply ID module 104, may be configured to receive a provider quality score. The provider quality score may be provided by a third party system, for example, and may serve as an indicator of the quality or likability of a particular provider. In this regard, the provider quality score may not necessarily be based on promotion information, but may in some embodiments be based on other data relating to the provider, such as reviews provided on a website, and/or feedback collected from social media sites. Additionally or alternatively, the promotional system may generate and/or maintain provider quality scores. The promotional system may therefore determine that a provider may offer a successful promotion, based on the quality score of the provider. As such, a provider with a relatively high provider quality score may be identified as a target provider to which to provide a service need.

Continuing to operation 540, the promotional system, such as with service need identification module 120, may be configured to generate a communication to the provider, providing the service need information and the opportunity to contract to offer a promotion. In some embodiments, following receipt of the service need, a provider may choose to partner with a promotional system associated with the promotional system in offering a promotion that meets the service need. In some example scenarios, offering of the promotion may involve an expansion of a current business, such as a Japanese restaurant expanding their services to offer takeout Chinese food. In some scenarios, offering of the promotion may involve opening of a new business by the provider. For example, a Chinese restaurant may receive information regarding a service need for a similar restaurant in a different area, and the restaurant may opt to open an additional location on the other side of town, for example. In some embodiments, the offering of the promotion may involve offering a service already provided by the provider that may not otherwise be successfully promoted without the assistance of the promotional system.

The operations of FIG. 5 are provided as example operations performed by the promotional system to identify a target provider. It will be appreciated that other methods may be utilized by the promotional system in targeting a provider.

Figure 6:
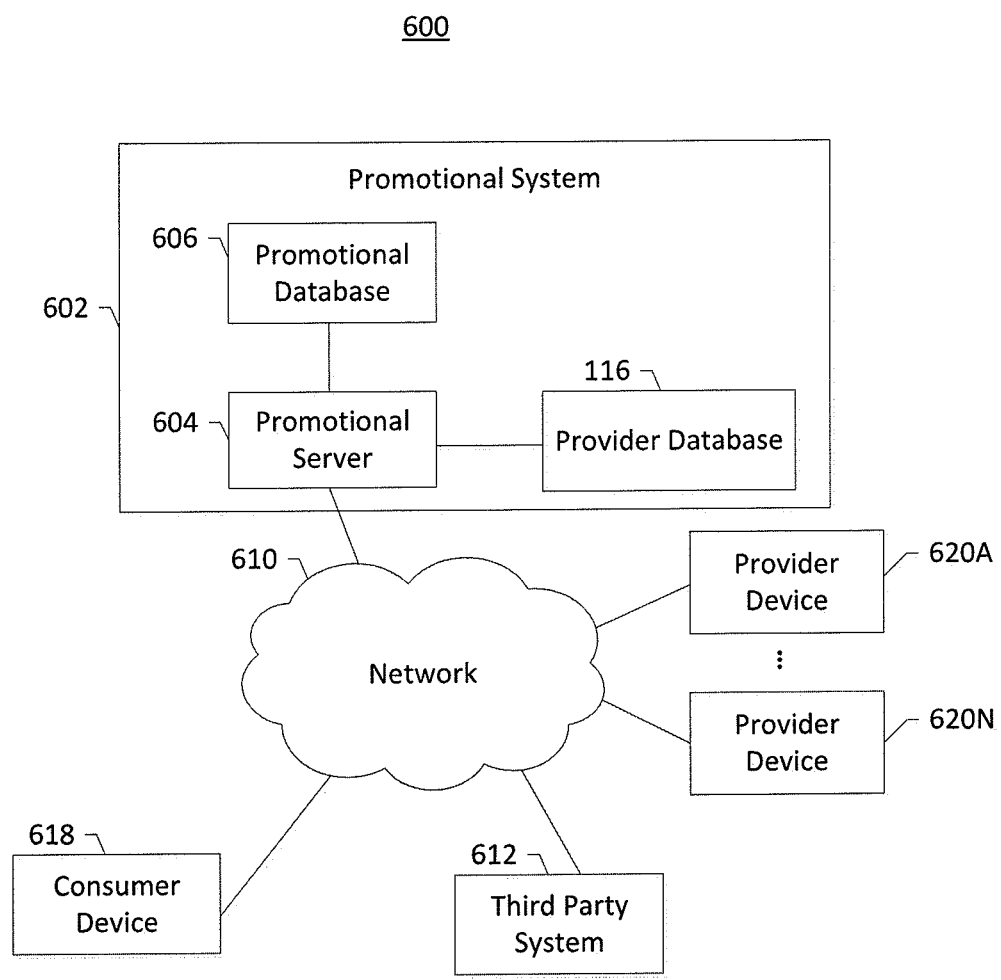
FIG. 6 shows an example system in accordance with some example embodiments discussed herein.

FIG. 6 shows system 600 including an example network architecture for a retailing system, which may include one or more devices and sub-systems that are configured to implement some embodiments discussed herein. For example, system 600 may include promotional system 602, which can include, for example, promotional server 604, promotional database 606, and provider database 116, among other things (not shown).

Promotional server 604 can be any suitable network server and/or other type of processing device, configured to manage operations of the promotional system and process data received from the promotional database 606 and/or provider database 116. The promotional server 604 may additionally or alternatively process incoming data to the promotional system 602. Promotional database 606 may be any suitable network database configured to store data regarding promotions and promotion transaction history, such as that discussed herein. Provider database 116 may be any suitable network database configured to store data regarding providers currently associated with promotions offered on the promotional system, and/or providers not yet associated with a promotion or the promotional system. In some embodiments, the provider database 116 may be configured to receive provider information from a third party system 612, or provider device 620. In some embodiments, the provider database 116 may be implemented on the same device as the promotional database 606. In this regard, promotional system 602 may include, for example, at least one backend data server, network database, cloud computing device, among other things.

Promotional system 602 may be coupled to one or more provider devices 620A-620N via network 410. In this regard, network 410 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 410 may include a cellular telephone, an 802.11, 802.16, 802.20, and/or WiMax network. Further, the network 410 may include a public network, such as the Internet, a private network, such as an intranet, or combinations thereof, and may utilize a variety of networking protocols now available or later developed including, such as, but not limited to, TCP/IP based networking protocols.

Provider devices 620A-620N may be implemented as a personal computer and/or other networked device, such as a cellular phone, tablet computer, mobile device, etc., that may be used to access promotional system 602 in order to receive information regarding a service need, or to engage in an agreement with a promotional system to offer a promotion for sale, for example. In some embodiments, information regarding a provider may be transmitted from a provider device 620 to the promotional system 602. The depiction in FIG. 6 of "N" provider devices is merely for illustration purposes.

Promotional system 602 may be configured to communicate with one or more consumer devices 618 via network 410. Consumer devices 618 may each be implemented as a personal computer and/or other networked device, such as a cellular phone, tablet computer, mobile device, etc., that may be used for accessing promotional system 602 in order to view and/or purchase promotions.

System 600 may also include at least one third party system 612, such as a credit card payment processing system, a social networking site, and/or a data collection system, among other things. In some embodiments the third party system 612 may provide provider information to promotional system 602. The third party system 612 may, in some embodiments, act as a provider of marketing data, which the promotional system 602 may utilize to identify target geographic areas and/or providers. In some embodiments, the promotional system may transmit service needs to a third party system 612, and the third party system 612 may proceed with an analysis in determining a further recipient of the service need.

Figure 7:
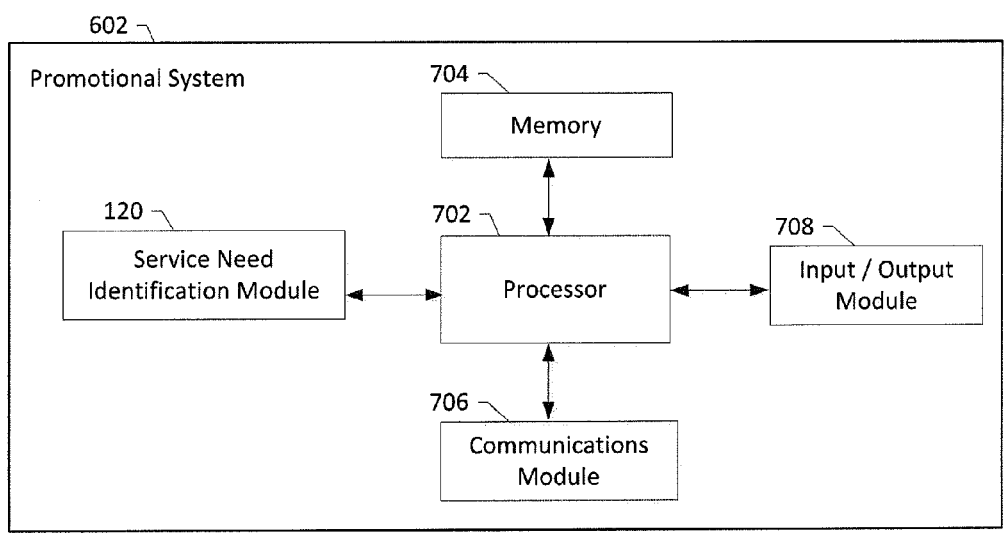
FIG. 7 shows a schematic block diagram of a promotional system in accordance with some example embodiments discussed herein.

FIG. 7 shows a schematic block diagram of promotional system 602. As illustrated in FIG. 7, in accordance with some example embodiments, promotional system 602 may include various means, such as one or more processors 702, memories 704, communications modules 706, and/or input/output modules 708. In some embodiments a service need identification module 120 may be included. As referred to herein, the term "module" includes hardware, software and/or firmware configured to perform one or more particular functions. In this regard, promotional system 602 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 704) that is executable by a suitably configured processing device (e.g., processor 702), or some combination thereof.

Processor 702 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 7 as a single processor, in some embodiments, processor 702 comprises a plurality of processors. The plurality of processors may be embodied on a single computing device or may be distributed across a plurality of computing devices collectively configured to function as promotional system 602. The plurality of processors may be in operative communication with each other and may be collectively configured to perform one or more functionalities of promotional system 602 as described herein. In an example embodiment, processor 702 is configured to execute instructions stored in memory 704 or otherwise accessible to processor 702. These instructions, when executed by processor 702, may cause promotional system 602 to perform one or more of the functionalities of promotional system 602 as described herein.

Whether configured by hardware, firmware/software methods, or by a combination thereof, processor 702 may comprise an entity capable of performing operations according to embodiments of the present invention while configured accordingly. Thus, for example, when processor 702 is embodied as an ASIC, FPGA or the like, processor 702 may comprise specifically configured hardware for conducting one or more operations described herein. As another example, when processor 702 is embodied as an executor of instructions, such as may be stored in memory 704, the instructions may specifically configure processor 702 to perform one or more operations described herein, such as those discussed in connection with FIGS. 1-3.

Memory 704 may comprise, for example, volatile memory, non-volatile memory, or some combination thereof. Although illustrated in FIG. 7 as a single memory, memory 704 may comprise a plurality of memory components. The plurality of memory components may be embodied on a single computing device or distributed across a plurality of computing devices. In various embodiments, memory 704 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In some embodiments, memory 704 may comprise promotional database 606 and/or provider database 116. Memory 704 may be configured to store information, data (including user profile information, transaction history, promotion information, and/or analytics data), applications, instructions, or the like for enabling promotional system 602 to carry out various functions in accordance with example embodiments of the present invention. For example, in at least some embodiments, memory 704 is configured to buffer input data for processing by processor 702. Additionally or alternatively, memory 704 may be configured to store program instructions for execution by processor 702. Memory 704 may store information in the form of static and/or dynamic information. This stored information may be stored and/or used by promotional system 602 during the course of performing its functionalities.

Communications module 706 may be embodied as any device or means embodied in circuitry, hardware, a computer program product comprising computer readable program instructions stored on a computer readable medium (e.g., memory 704) and executed by a processing device (e.g., processor 702), or a combination thereof that is configured to receive and/or transmit data from/to another device, such as, for example, a second promotional system 602 and/or the like. In some embodiments, communications module 706 (like other components discussed herein) can be at least partially embodied as or otherwise controlled by processor 702. In this regard, communications module 706 may be in communication with processor 702, such as via a bus. Communications module 706 may include, for example, an antenna, a transmitter, a receiver, a transceiver, network interface card and/or supporting hardware and/or firmware/software for enabling communications with another computing device. Communications module 706 may be configured to receive and/or transmit any data that may be stored by memory 704 using any protocol that may be used for communications between computing devices. Communications module 706 may additionally or alternatively be in communication with the memory 704, input/output module 708 and/or any other component of promotional system 602, such as via a bus.

Input/output module 708 may be in communication with processor 702 to receive an indication of a user input and/or to provide an audible, visual, mechanical, or other output to a user (e.g., provider and/or consumer). As such, input/output module 708 may include support, for example, for a keyboard, a mouse, a joystick, a display, a touch screen display, a microphone, a speaker, a RFID reader, barcode reader, biometric scanner, and/or other input/output mechanisms. In embodiments wherein promotional system 602 is embodied as a server or database, aspects of input/output module 708 may be reduced as compared to embodiments where promotional system 602 is implemented as an end-user machine (e.g., consumer device and/or provider device) or other type of device designed for complex user interactions. In some embodiments (like other components discussed herein), input/output module 708 may even be eliminated from promotional system 602. Alternatively, such as in embodiments wherein promotional system 602 is embodied as a server or database, at least some aspects of input/output module 708 may be embodied on an apparatus used by a user that is in communication with promotional system 602, such as for example, provider device 620. Input/output module 708 may be in communication with the memory 704, communications module 706, and/or any other component(s), such as via a bus. Although more than one input/output module and/or other component can be included in promotional system 602, only one is shown in FIG. 7 to avoid overcomplicating the drawing (like the other components discussed herein).

Service need identification module 120 may provide functionality related to identifying a service need to provide to a provider, as described herein. In some embodiments, some or all of the functionality for identifying a service need to provide to a provider may be performed by processor 702. In this regard, the example processes discussed herein can be performed by at least one processor 702 and/or service need identification module 120. For example, non-transitory computer readable storage media can be configured to store firmware, one or more application programs, and/or other software, which include instructions and other computer-readable program code portions that can be executed to control each processor (e.g., processor 702 and/or service need identification module 120) of the components of system 600 to implement various operations, including the examples shown below. As such, a series of computer-readable program code portions are embodied in one or more computer program products and can be used, with a computing device, server, and/or other programmable apparatus, to produce machine-implemented processes.

As will be appreciated, any such computer program instructions and/or other type of code may be loaded onto a computer, processor or other programmable apparatus circuitry to produce a machine, such that the computer, processor, or other programmable circuitry that executes the code on the machine creates the means for implementing various functions, including those described herein.

It is also noted that all or some of the information presented by the example displays discussed herein can be based on data that is received, generated and/or maintained by one or more components of system 600. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 702 and/or service need identification module 120 discussed above with reference to FIG. 7, to produce a machine, such that the computer program product includes the instructions which execute on the computer or other programmable data processing apparatus create a means for implementing the functions specified in the flowchart block or blocks.

These computer program instructions may also be stored in a computer-readable storage medium (e.g., memory 704) that can direct a computer or other programmable data processing apparatus to function in a particular manner, such that the instructions stored in the computer-readable storage medium produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
   accessing, on a promotional server, demand information relating to one or more virtual promotions associated with a sample geographic area, wherein the demand information is indicative of at least a forecasted number of sales of the virtual promotions and an estimated revenue for providers generated by the forecasted number of sales, and is calculated as a function of available inventory of offers related to the one or more virtual promotions;
   by the promotional server, identifying a target geographic area having a similar demographic to that of the sample geographic area, wherein the similar demographic is determined based on a common or overlapping range of a demographic characteristic;
   with a supply identification module of the promotional server, calculating a residual demand representative of unmet demand from the demand information for the target geographic area as a function of a forecasted demand reduced by a number of current promotions of an available inventory, the residual demand comprising one or more virtual promotions and an associated quantity of at least a portion of the one or more virtual promotions that is representative of a residual demand for the target geographic area;
   with a service need identification module of the promotional server, identifying at least one service need, wherein the at least one service need is derived from the demand information and the residual demand and is indicative of a needed service in the target geographic area;
   by the promotional server, identifying potential providers associated with the target geographic area;
   by the promotional server, calculating provider suitability scores for the respective potential providers associated with the target geographic area, wherein the provider suitability scores account for, the service need, similarities of the respective potential provider with another provider that offers a same or similar service associated with the service need but that does not meet the residual demand, and data obtained from at least a third party source indicating at least one of a quality or likability of the respective provider;
   by the promotional server, identifying a target provider according to a ranking of the provider suitability scores;
   by the promotional server, generating and storing on memory at least one virtual promotion suggested to be offered for purchase by consumers and for redemption in the target geographic area, wherein the at least one virtual promotion comprises at least (a) a category of service based on the service need, (b) a quantity of instruments of the virtual promotion to be offered, and (c) a purchase price range per instrument of the virtual promotion, based on at least the demand information;
   by the promotional server, transmitting data indicative of the target provider and the virtual promotion to an assignment module configured to assign a sales resource affiliated with the promotional server to the target provider and the virtual promotion; and
   from the promotional server, transmitting the service need and the virtual promotion over a network to a provider device associated with the target provider to enable the target provider to engage in an agreement to offer the virtual promotion with use of the provider device.

2. The method according to claim 1, further comprising:
   by the promotional server, calculating a probability that a particular user would buy a particular promotion in a particular time frame for at least a portion of the plurality of users; and
   by the promotional server, determining the forecasted number of sales and the estimated revenue for at least a portion of the one or more virtual promotions as a function of at least the probability associated with the at least one virtual promotion.

3. The method according to claim 1, wherein the demand information comprises at least one of a category, subcategory, quantity, location information, and price range.

4. The method according to claim 1, further comprising:
   by the promotional server, calculating an estimated change in sales for respective potential providers, wherein the suitability score is calculated further based on the estimated potential change in sales.

5. The method according to claim 1, further comprising:
   by the promotional server, receiving provider information for respective potential providers in the target geographic area, wherein the target provider suitability score is calculated further based on the provider information.

6. The method according to claim 1, further comprising:
   by the promotional server, analyzing prior promotion information by measuring success by calculating at least one of revenue or instruments sold, wherein the target provider is identified further based a similarity of the target provide and the prior promotion information.

7. The method according to claim 1, further comprising:
by the promotional server, receiving a provider quality score from at least one of review or feedback information from a social media website, wherein the target provider is further based on the provider quality score.

8. The method according to claim 1, further comprising:
by the promotional server, determining a need for a new business based on the service need; and
by the promotional server, notifying the third party system of the need for a new business.

9. The method according to claim 1, further comprising:
by the promotional server, identifying the service need further based on a provider that offers a service associated with the service need but cannot meet a current demand quantity.

10. The method of claim 1, wherein the target provider is located in a location different than the target geographic area, and the virtual promotion is associated with a new proposed location to be opened by the target provider in the target geographic area.

11. A server at least one processor and at least one memory including computer program code, the at least one memory and the computer program code configured to, with the processor, cause the server to at least:
access, on the server, demand information relating to one or more virtual promotions associated with a sample geographic area, wherein the demand information is indicative of at least a forecasted number of sales of the virtual promotions and an estimated revenue for providers generated by the forecasted number of sales, and is calculated as a function of available inventory of offers related to the one or more virtual promotions;
identify a target geographic area having a similar demographic to that of the sample geographic area, wherein the similar demographic is determined based on a common or overlapping range of a demographic characteristic;
with a supply identification module of the server, calculate a residual demand representative of unmet demand from the demand information for the target geographic area as a function of a forecasted demand reduced by a number of current promotions of an available inventory, the residual demand comprising one or more virtual promotions and an associated quantity of at least a portion of the one or more virtual promotions that is representative of a residual demand for a geographic area;
with a service need identification module of the server, identify at least one service need, wherein the at least one service need is derived from the demand information and the residual demand and is indicative of a needed service in the target geographic area;
identify potential providers associated with the target geographic area;
calculate provider suitability scores for the respective potential providers associated with the target geographic area, wherein the provider suitability scores account for the service need, similarities of the respective potential provider with another provider that offers a same or similar service associated with the service need but that does not meet the residual demand, and data obtained from at least a third party source indicating at least one of a quality or likability of the respective provider;
identify a target provider according to a ranking of the provider suitability scores;
generate and storing on the at least one memory at least one virtual promotion suggested to be offered for purchase by consumers and for redemption in the target geographic area, wherein the at least one virtual promotion comprises at least (a) a category of service based on the service need, (b) a quantity of instruments of the virtual promotion to be offered, and (c) a purchase price range per instrument of the virtual promotion, based on at least the demand information;
transmit data indicative of the target provider and the virtual promotion to an assignment module configured to assign a sales resource affiliated with the server to the target provider and the virtual promotion; and
transmit the service need and the virtual promotion over a network to a provider device associated with the target provider to enable the target provider to engage in an agreement to offer the virtual promotion with use of the provider device.

12. The server according to claim 11, wherein the at least one memory and the computer program code are further configured to cause the server to at least:
calculate a probability that a particular user would buy a particular promotion in a particular time frame for at least a portion of the plurality of users; and
determine the forecasted number of sales and the estimated revenue for at least a portion of the one or more virtual promotions as a function of at least the probability associated with the at least one virtual promotion.

13. The server according to claim 11, wherein the demand information comprises at least one of a category, subcategory, quantity, location information, and price range.

14. The server according to claim 11, wherein the at least one memory and the computer program code are further configured to cause the server to at least:
calculate an estimated change in sales for a provider, wherein the target provider is identified further based on the estimated potential change in sales.

15. The server according to claim 11, wherein the at least one memory and the computer program code are further configured to cause the server to at least:
receive provider information for providers in the target geographic area, wherein the target provider is identified further based on the provider information.

16. The server according to claim 11, wherein the at least one memory and the computer program code are further configured to cause the server to at least:
analyze prior promotion information, wherein the target provider is identified further based on the prior promotion information.

17. The server according to claim 11, wherein the at least one memory and the computer program code are further configured to cause the server to at least:
receive a provider quality score,
wherein the target provider is identified further based on the provider quality score.

18. The server according to claim 11, wherein the at least one memory and the computer program code are further configured to cause the server to at least:
determine a need for a new business based on the service; and
notify the third party system of the need for a new business.

19. The server according to claim 11, wherein the at least one memory and the computer program code are further configured to cause the server to at least:

identify the service need further based on a provider that offers a service associated with the service need but cannot meet a current demand quantity.

20. A computer program product comprising at least one non-transitory computer-readable storage medium having computer-executable program code instructions stored therein, the computer-executable program code instructions comprising program code instructions to:

access, on a promotional server, demand information relating to one or more virtual promotions associated with a sample geographic area, wherein the demand information is indicative of at least a forecasted number of sales of the virtual promotions and an estimated revenue for providers generated by the forecasted number of sales, and is calculated as a function of available inventory of offers related to the one or more virtual promotions;

by the promotional server, identify a target geographic area having a similar demographic to that of the sample geographic area, wherein the similar demographic is determined based on a common or overlapping range of a demographic characteristic;

with a supply identification module of the promotional server, calculate a residual demand representative of unmet demand from the demand information for the target geographic area as a function of a forecasted demand reduced by a number of current promotions of an available inventory, the residual demand comprising one or more virtual promotions and an associated quantity of at least a portion of the one or more virtual promotions that is representative of a residual demand for the geographic area;

with a service need identification module of the promotional server, identify at least one service need, wherein the at least one service need is derived from the demand information and the residual demand and is indicative of a needed service in the target geographic area;

by the promotional server, identify potential providers associated with the target geographic area;

by the promotional server, calculate provider suitability scores for the respective potential providers associated with the target geographic area, wherein the provider suitability scores account for the service need, similarities of the respective potential provider with another provider that offers a same or similar service associated with the service need but that does not meet the residual demand, and data obtained from at least a third party source indicating at least one of a quality or likability of the respective provider;

by the promotional server, identify a target provider according to a ranking of the provider suitability scores;

by the promotional server, generate and store on memory at least one virtual promotion suggested to be offered for purchase by consumers and for redemption in the target geographic area, wherein the at least one virtual promotion comprises at least (a) a category of service based on the service need, (b) a quantity of instruments of the virtual promotion to be offered, and (c) a purchase price range per instrument of the virtual promotion, based on at least the demand information;

by the promotional server, transmit data indicative of the target provider and the virtual promotion to an assignment module configured to assign a sales resource affiliated with the promotional server to the target provider and the virtual promotion; and from the promotional server, transmit the service need and the virtual promotion over a network to a provider device associated with the target provider to enable the target provider to engage in an agreement to offer the virtual promotion with use of the provider device.

21. The computer program product according to claim 20, wherein the computer-executable program code instructions further comprise program code instructions to:

by the promotional server, calculate a probability that a particular user would buy a particular promotion in a particular time frame for at least a portion of the plurality of users; and by the promotional server, determine the forecasted number of sales and the estimated revenue for at least a portion of the one or more virtual promotions as a function of at least the probability associated with the at least one virtual promotion.

22. The computer program product according to claim 20, wherein the demand information comprises at least one of a category, subcategory, quantity, location information, and price range.

23. The computer program product according to claim 20, wherein the computer-executable program code instructions further comprise program code instructions to:

by the promotional server calculate a provider suitability score for a provider; and by the promotional server, identify a target provider based on the provider suitability score.

24. The computer program product according to claim 20, wherein the computer-executable program code instructions further comprise program code instructions to:

by the promotional server, calculate an estimated change in sales for a provider; and by the promotional server, identify a target provider based on the estimated potential change in sales.

25. The computer program product according to claim 20, wherein the computer-executable program code instructions further comprise program code instructions to:

by the promotional server, receive provider information for providers in the target geographic area, wherein the target provider is identified by the promotional server, based on the provider information.

26. The computer program product according to claim 20, wherein the computer-executable program code instructions further comprise program code instructions to:

by the promotional server, analyze prior promotion information, wherein the target provider is identified further based on the prior promotion information.

27. The computer program product according to claim 20, wherein the computer-executable program code instructions further comprise program code instructions to:

by the promotional server, receive a provider quality score, wherein the target provider is identified further based on the provider quality score.

28. The computer program product according to claim 20, wherein the computer-executable program code instructions further comprise program code instructions to:

by the promotional server, determine a need for a new business based on the service; and by the promotional server, notify the third party system of the need for a new business.

29. The computer program product according to claim 20, wherein the computer-executable program code instructions further comprise program code instructions to:

by the promotional server, identify the service need further based on a provider that offers a service associated with the service need but cannot meet a current demand quantity.

\* \* \* \* \*

UNITED STATES PATENT AND TRADEMARK OFFICE
CERTIFICATE OF CORRECTION

PATENT NO. : 9,947,021 B1
APPLICATION NO. : 13/804403
DATED : April 17, 2018
INVENTOR(S) : Shariff et al.

It is certified that error appears in the above-identified patent and that said Letters Patent is hereby corrected as shown below:

On the Title Page

Item (54) and in the Specification, Column 1, Lines 1-3:
The Title:
"METHOD, APPARATUS, AND COMPUTER PRODUCT FOR IDENTIFYING A SERVICE NEED VIA A PROMOTIONAL SYSTEM" should read --METHOD, APPARATUS, AND COMPUTER PROGRAM PRODUCT FOR IDENTIFYING A SERVICE NEED VIA A PROMOTIONAL SYSTEM--.

Signed and Sealed this
Second Day of October, 2018

Andrei Iancu
*Director of the United States Patent and Trademark Office*